Patented Sept. 6, 1932

1,875,688

UNITED STATES PATENT OFFICE

LEO M. CHRISTENSEN, OF TERRE HAUTE, INDIANA, ASSIGNOR TO COMMERCIAL SOLVENTS CORPORATION, OF TERRE HAUTE, INDIANA, A CORPORATION OF MARYLAND

FERMENTATION OF CELLULOSIC MATERIALS

No Drawing.   Application filed November 14, 1929. Serial No. 407,293.

My invention relates to a method of fermenting cellulosic materials for the production of acetic and butyric acids and other useful products. More particularly, my invention relates to the improvement in the process of carrying out such fermentations, which consists in the reuse of unfermented material. Other objects of the invention will appear from the discussion which follows.

In United States Patents Nos. 1,443,881, 1,602,306, and 1,639,571, Herbert Langwell has described methods of fermenting cellulosic materials by the aid of thermophilic bacteria which produce acetic and butyric acids, ethyl alcohol, and gases such as carbon dioxide, methane and hydrogen. According to the method described in these patents, a mash is prepared from some comminuted form of cellulosic material such as, for example, corncobs. This mash is then inoculated with a mixture of organisms capable of producing acetic and butyric acids and of the character ordinarily found in almost any form of fermenting vegetable matter, stable manure, pond mud, septic sewage, tank mud, soil, etc. These organisms are usually found in the intestinal tracts of cellulose-consuming animals, and accordingly a convenient form of inoculum is obtained by selecting material from the center of a steaming stable manure heap or from such other sources as is most convenient or suitable. The fermentation is then allowed to take place at temperatures in the neighborhood of 60° C.

Like all protoplasmic bodies bacteria consist of carbon, oxygen, hydrogen, and nitrogen, together with inorganic salts and varying quantities of phosphorus and sulphur. In order that bacteria may develop and multiply, therefore, they must be supplied with these substances in proper quantities and in suitable form for assimilation. The first three materials named are present in the cellulose used as the raw material. Certain of the other required materials are usually present in small but insufficient quantities with the raw material used as the source of the cellulosic material. These necessary nutrients are usually supplied in the form of varying proportions of such materials as potassium sulphate, sodium phosphate, ammonium chloride, ammonium sulphate, potassium chloride, slops from the butyl-acetonic fermentation process, "steep water", etc.

It has been found that, in general, bacteria which produce acids during the course of a fermentation become less and less active as the concentration of acid in the medium increases. After a certain point is reached the action of the bacteria becomes negligible unless the acid is removed from the medium. Such a condition is met with in the present case. Langwell, in the patents cited above, has recommended that the hydrogen ion concentration of the fermenting medium be maintained within the limits of about pH 5.0 to pH 9.0 measured in the bulk of the mash by the employment (a) of oxides, hydroxides, carbonates or bicarbonates of alkali metals including ammonium, or (b) oxides, hydroxides, carbonates, or bicarbonates of alkaline earth metals, including magnesium. If compounds of the type included under (b) are used, Langwell specified that alkali metal salts such as sulphates, phosphates, or carbonates should be added at intervals in order to precipitate the alkaline earth metals present in solution in the form of soluble salts such as calcium acetate, since alkaline earth metals in solution were believed to be undesirable. It is preferred however, to follow the procedure outlined under (a) in which case it is necessary to make small additions of the neutralizing agent at intervals thruout the course of the fermentation. Whatever method is resorted to, the mash should be agitated at frequent intervals or at least after each addition of neutralizing agent.

The fermentation may be carried out under a fairly wide range of operation conditions, it being possible, for example, to operate at temperatures ranging from about 35° C. to about 70° C. with 60° C. as about the optimum. From a commercial standpoint, among the most important factors involved in the application of this process are the time required for the completion of the fermentation, the concentrations of cellulose which may be successfully fermented, the proportions of the raw material actually fermented, the yields of acids and other valuable products obtained therefrom, etc. From a consideration of these factors it is readily seen that the operating conditions can be selected only after careful evaluation of these variables and that when one is varied the chances are highly in favor of radically affecting the other variables entering into the process. For example, when using a 2% cellulose mash a much higher yield of acids based on the amount of raw materials used is obtained than when using a 7% concentration, a 50–60% yield being obtained in the first case as compared to only about 30% yield in the latter case. The fermentation of the dilute mash takes place more rapidly and there is a more complete utilization of the cellulosic material. In recovering the acids and other useful products from the fermented mash, however, other factors must be taken into consideration, and it is found to be highly advantageous to obtain the fermentation products in as concentrated form as possible without at the same time losing too great a proportion of the raw material in the form of unfermented matter. It is likewise important that as large a proportion of the material be fermented in as short a time as possible in order to cut down to as low a figure as possible the amount of raw material being processed and the amount of equipment needed for this purpose. A number of methods have been suggested for attaining these desired results.

In commercial scale operation it has been found most practical to employ a mash of approximately 7% concentration by weight, as for example 7% of corncobs ground sufficiently fine so as to pass a 30 mesh screen. On inoculating such a mash with a suitable amount of inoculum containing thermophilic bacteria of the kind hereinabove specified and allowing fermentation to take place at approximately 60° C., the fermentation will be substantially completed in from 7 to 10 days. At the end of this time the rate of fermentation will have decreased to a point where it will be unprofitable to allow it to continue. At this time approximately 40 to 50% of the cob meal still remains unfermented—which, I have now found may be satisfactorily used in succeeding fermentations of the same character. In the past, it has generally been regarded as impossible or impractical to do this due to the fact that during the fermentation, materials toxic to the bacteria were also produced which after a time would reach such a concentration as to inhibit further bacterial action. Any such materials that may be formed in the present process are at least largely removed from the fermentable raw material in my method of procedure and very favorable results are obtained.

The following is cited as an example illustrating my new process, and it is naturally understood that my process includes the use of the usual equivalents. In carrying out the process on a laboratory scale, two flasks, each containing 9.33 grams of fine corncob meal per 100 c. c. of distillation slop were prepared. It is understood, of course, that the mash could have been made up with yeast water, "steep water", or other distillery waste, as specified in U. S. application for Letters Patent Serial No. 150,139, filed November 22, 1926. According to the specification of this application, equivalent amounts of nutrients may be added in the form of waste liquors or residues from fermentation processess, such as those obtained in the production of ethyl alcohol, butyl alcohol, acetone, butyric acid, lactic acid and the like, with or without inorganic nutrients. According to another modification the mash may be made up with water and suitable inorganic nutrient materials of the character hereinabove specified added. Whatever method is employed for the preparation of the cellulose-containing mash, inoculation is effected with a culture of thermophilic bacteria which ferment cellulosic material with the production of acetic and butyric acids and other materials and allowed to ferment. After 7 days of fermentation at approximately 60° C., during which time the hydrogen ion concentration was maintained within the limits pH 5.0 to pH 9.0 measured within the bulk of the mash by frequent additions of sodium bicarbonate, the insoluble residue was removed by filtration thru cheese cloth or by other suitable means such as a filter press, etc. The unfermented residue thus obtained may be either washed or again used without further treatment. Fresh butyl-acetonic slop and sufficient fresh corncob meal to produce a total cob meal concentration equivalent to 9.33 grames per 100 c. c. were then added to the residue, and the resulting mash again allowed to ferment for 7 days at 60° C. At this time the unfermented residue was again recovered and used in the preparations of a succeeding batch of mash which was allowed to ferment for only 7 days. At the end of a number of such steps the percentage of lignin and other materials attacked to only a slight extent by the organism used, reaches such a figure as to make it advisable to discard the residue and start a new cycle of operations.

From the above description it will be noted that it is only necessary to inoculate the mash when starting with fresh cob meal, the unfermented residue serving as the inoculum in each of the succeeding steps. The fact that this unfermented residue can be used as a satisfactory method of inoculation is one of the important advantages of my new method of procedure. One of the most serious drawbacks to the commercial success of a process of this type is due to the fact that the bacteria employed multiply so slowly. Since this is the case it is usually advisable to take a large volume of inoculum containing a large number of bacteria or else lose considerable valuable time after each inoculation while the culture is being built up to the concentration required to give the necessary rate of fermentation. As the fermentation nears completion, and the unfermented matter is allowed to settle it will be found, as a rule, that the clear liquor contains a relatively small proportion of the bacteria, the greater proportion being found in the lower portion with the solid matter. When the latter is introduced with a fresh batch of mash a very large number of bacteria is necessarily introduced at the same time, and in this way the mash is more effectively inoculated than would be possible by the usual means. In this manner the initial incubation period is appreciably decreased.

The data shown in the following table were obtained from the mash prepared and treated as above described. Duplicate fermentations (#1 and #2) were carried out, starting with 3000 c. c. of butyl-acetonic slop and 280 grams of cob meal as shown by the first figures in the columns 1 and 2. At the end of 7 day periods the amounts of fermented liquor shown in columns 4 and 5 were withdrawn and fresh slop and cob meal were added as shown in columns 1 and 2. The volatile acid in the withdrawn liquor was determined in each case and these values are given in columns 6 and 7.

Table

| Butyl-acetonic slop used c.c. | Corn-cob meal added gms. | Time of fermentation days | Withdrawn | | | |
|---|---|---|---|---|---|---|
| | | | Volume c.c. | | Volatile acid as acetic gm./100 c.c. | |
| | | | #1 | #2 | #1 | #2 |
| 3,000 | 280 | 7 | 2,290 | 2,300 | 2.19 | 2.52 |
| 2,000 | 112 | 7 | 1,620 | 1,665 | 2.68 | 2.63 |
| 2,300 | 112 | 7 | 1,820 | 1,950 | 2.83 | 2.63 |
| 2,200 | 93 | 7 | 2,000 | 1,975 | 2.53 | 2.48 |
| 2,200 | 93 | 7 | 3,340 | 3,340 | 2.33 | 2.41 |
| Total 11,700 | 690 | 35 | 11,070 | 11,230 Mean | 2.51 | 2.54 |

Yield of volatile acid as acetic gm./100 gm. cob meal #1—39.7, #2—41.0.

These yields were calculated from the values given in columns 4 and 6 and columns 5 and 7 of the table and represent the total volatile acid withdrawn from the fermentation in the five stages, divided by the total weight of corncob meal added.

When carrying out the fermentation in the usual manner it is desirable to operate so as to complete the fermentation in approximately seven days to obtain as high a concentration of acids in the mash as possible and to utilize as much of the fermentable material as possible. As has been previously indicated, approximately 7% concentration of corncob meal has been found to be about the optimum concentration under such conditions. From such a concentration an average yield of about 30% acids calculated as acetic is obtained in seven days. The data shown above indicates, therefore, that not only a higher concentration of acids in the mash is obtainable by my new process, but also there is a decided increase in the amounts of acids recovered from a given amount of raw material. In my new process it is practical to use higher concentrations of raw material in the mash due to the fact that the unfermented material is not thrown away after each fermentation, and hence it is possible to use concentrations of cellulosic material as high as 10% to 12% or even higher in place of about 7% as has formerly been the case. When such high concentrations are used the acid concentration obtained is much higher than can be obtained with 7% mash.

Now having described my invention, what I claim as new and novel is:

1. In a process for the fermentation of cellulosic materials, the improvement which comprises successively utilizing as the inoculum in succeeding fermentations the unfermented cellulosic material from previous similar fermentations.

2. In a process for the production of acetic and butyric acids, ethyl alcohol, and other useful products by the fermentation of cellulosic materials, the improvement which comprises successively utilizing as the inoculum in succeeding fermentations the unfermented cellulosic material from previous similar fermentations.

3. In a process for the fermentation of cellulosic materials, the step which comprises fermenting a mixture of unfermented cellulosic material from a previous fermentation and cellulosic material which has not previously been subjected to fermentative action.

4. In a process for the fermentation of cellulosic materials, the step which comprises fermenting a mixture comprising approximately equal proportions of unfermented cellulosic material from a previous fermentation and cellulosic material which has not previously been subjected to fermentative action.

5. A process for the production of fatty acids from cellulosic materials, which comprises subjecting a mash of said materials containing unfermented cellulosic material from a previous fermentation to the action of bacteria capable of fermenting cellulose, controlling the acidity of the mash so that the hydrogen ion concentration is maintained preferably within the limits $10^{-9}$ and $10^{-5}$ measured in the bulk of the mash.

6. In a process for the fermentation of cellulosic materials, the steps which comprise recovering the unfermented cellulosic material from a previous fermentation and inoculating said recovered material as raw material with thermophilic bacteria, producing acetic and butyric acids in the succeeding fermentation.

7. In a process for the fermentation of cellulosic materials, the steps which comprise recovering the unfermented cellulosic material from a previous fermentation, adding fresh cellulosic material to said recovered unfermented matter to form a fermentable mash, and finally subjecting said mash to fermentation by thermophilic bacteria producing acetic and butyric acids and other useful products.

8. In a process for the fermentation of cellulosic materials, the step which comprises introducing into a fermentable mash the unfermented cellulosic material from a previous fermentation as the inoculum for a new fermentation.

In testimony whereof I affix my signature.

LEO M. CHRISTENSEN.